United States Patent
Paul et al.

(10) Patent No.: US 9,623,848 B2
(45) Date of Patent: Apr. 18, 2017

(54) VEHICLE BRAKE COOLING APPARATUS, AND METHODS OF USE AND MANUFACTURE THEREOF

(71) Applicant: Honda Motor Co., Ltd., Tokyo (JP)

(72) Inventors: Scott Andrew Paul, Dublin, OH (US); Stephen G. Rosepiler, Marysville, OH (US); Lorne R. Dyar, Plain City, OH (US); Yoshio Ishikawa, Dublin, OH (US); Matthew Vernon Roehl, Columbus, OH (US); Yuichiro Akita, Dublin, OH (US); Akihiko Koike, Dublin, OH (US); Edward C. Smith, Kenton, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 23 days.

(21) Appl. No.: 14/829,358

(22) Filed: Aug. 18, 2015

(65) Prior Publication Data

US 2017/0050624 A1    Feb. 23, 2017

(51) Int. Cl.
*B60T 5/00* (2006.01)
*F16D 65/78* (2006.01)
(Continued)

(52) U.S. Cl.
CPC ............... *B60T 5/00* (2013.01); *B62D 21/11* (2013.01); *B62D 65/04* (2013.01); *F16D 65/128* (2013.01);
(Continued)

(58) Field of Classification Search
CPC ...... F16D 65/128; F16D 65/78; F16D 65/847; F16D 2065/1328; F16D 2065/788; B60T 5/00; B60H 1/246; B60H 1/26; B62D 21/11; B62D 21/16; B62D 21/17; B60K 11/08; B60C 23/18; B60C 23/19
See application file for complete search history.

(56) References Cited

U.S. PATENT DOCUMENTS 2,980,194 A    4/1961    Ferdinand
4,805,747 A    2/1989    Moedinger et al.
(Continued)

FOREIGN PATENT DOCUMENTS

DE    4229945 A1 *    3/1994    ................ B60T 5/00
DE    10159783 A1 *    6/2003    ............. B60K 11/04
(Continued)

*Primary Examiner* — Laura Freedman
(74) *Attorney, Agent, or Firm* — Kenealy Vaidya LLP

(57) ABSTRACT

Some embodiments are directed to a duct assembly for cooling a brake assembly of a vehicle. The duct assembly can include a hollow inlet section that is disposed at the vehicle sub-frame and configured to capture air from beneath the vehicle sub-frame; and a hollow intermediate section that communicates with the inlet section so as to form a contiguous channel therewith. The intermediate section can be disposed entirely within the vehicle sub-frame. A hollow outlet section can communicate with the intermediate section so as to form a contiguous channel between the inlet, intermediate and outlet sections. The outlet section can be disposed and configured to direct the air captured by the inlet section to the front end of the brake assembly to thereby cool at least a portion of the brake assembly.

19 Claims, 13 Drawing Sheets

(51) Int. Cl.
*F16D 65/847* (2006.01)
*B62D 65/04* (2006.01)
*B62D 21/11* (2006.01)
*F16D 65/12* (2006.01)
*F16D 65/02* (2006.01)

(52) U.S. Cl.
CPC ........... *F16D 65/78* (2013.01); *F16D 65/847* (2013.01); *F16D 2065/1328* (2013.01); *F16D 2065/788* (2013.01)

(56) References Cited

U.S. PATENT DOCUMENTS

| | | | |
|---|---|---|---|
| 4,810,021 A * | 3/1989 | Burst | B60T 5/00 296/180.1 |
| 5,317,880 A | 6/1994 | Spears | |
| 5,513,893 A * | 5/1996 | Nakata | B62D 35/02 180/68.2 |
| 7,198,139 B2 * | 4/2007 | Wilson | F16D 65/78 188/264 AA |
| 7,600,615 B2 * | 10/2009 | Ramsay | B60T 5/00 188/264 AA |
| 7,886,859 B2 | 2/2011 | Caldirola | |
| 8,162,380 B2 * | 4/2012 | Sumitani | B62D 25/161 296/180.1 |
| 8,562,023 B2 | 10/2013 | Hino | |
| 8,590,937 B2 | 11/2013 | Hino | |
| 8,631,889 B2 | 1/2014 | Begleiter et al. | |
| 8,678,426 B1 | 3/2014 | Browne et al. | |
| 9,163,685 B2 * | 10/2015 | Carmassi | F16D 65/853 |
| 2009/0223757 A1 | 9/2009 | Ballard | |
| 2014/0262644 A1 | 9/2014 | Browne et al. | |
| 2015/0345578 A1 * | 12/2015 | Nightingale | B60K 11/085 188/264 AA |
| 2016/0272258 A1 * | 9/2016 | Gibson | B62D 35/02 |

FOREIGN PATENT DOCUMENTS

| | | | | |
|---|---|---|---|---|
| DE | 102005044062 | * | 5/2007 | B60C 23/18 |
| DE | 102013223668 | * | 5/2015 | B60T 5/00 |
| WO | 2014111475 A1 | | 7/2014 | |

* cited by examiner

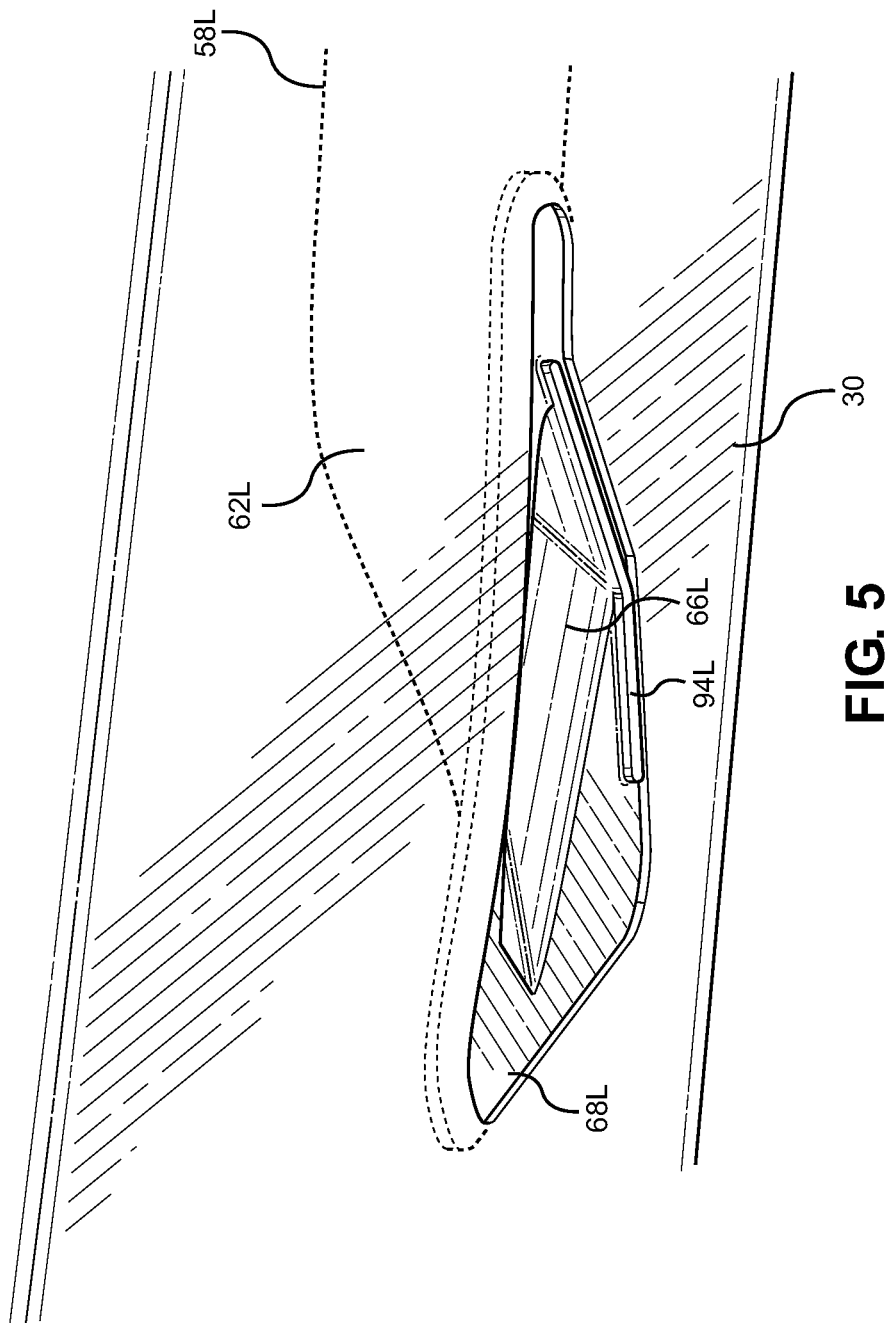

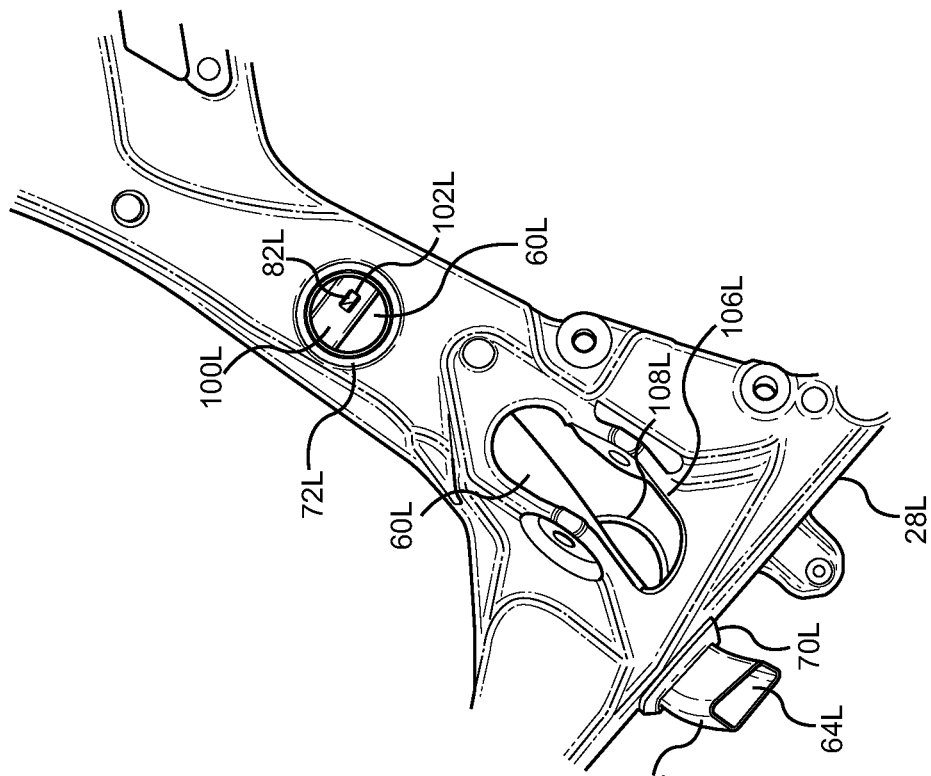
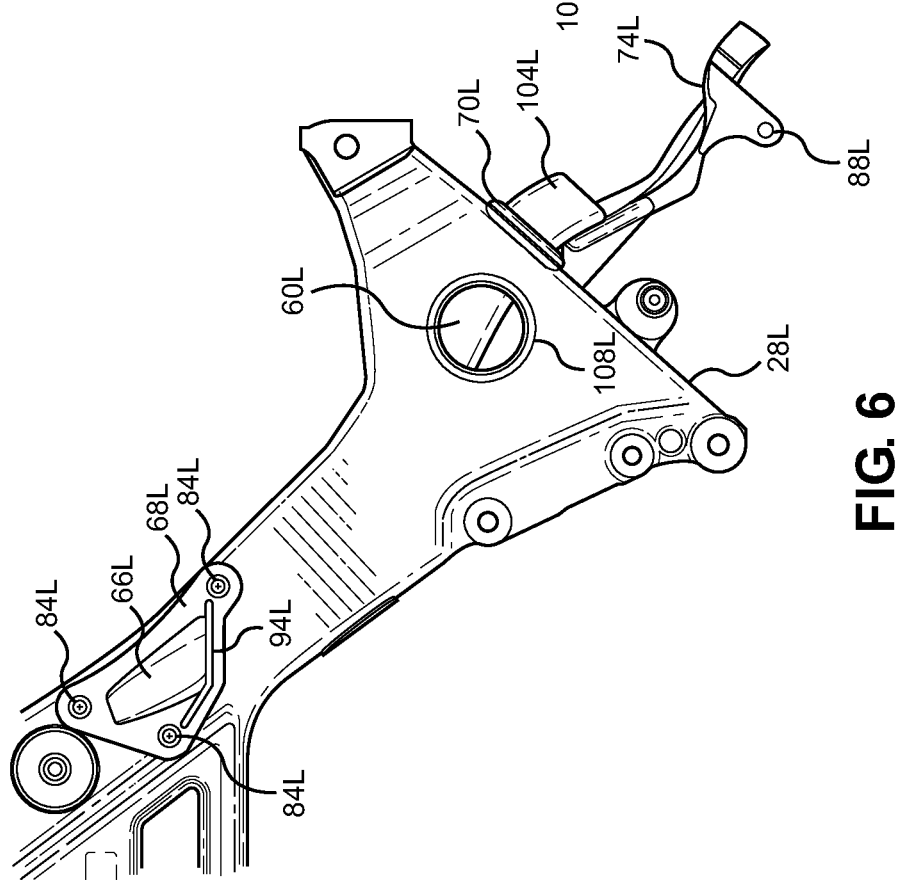

VEHICLE BRAKE COOLING APPARATUS, AND METHODS OF USE AND MANUFACTURE THEREOF

BACKGROUND

The disclosed subject matter relates to a vehicle brake cooling apparatus, and methods of use and manufacture thereof. More particularly, the disclosed subject matter relates to methods and apparatus for cooling various components of a vehicle brake assembly, such as by using air in the environment of the vehicle.

Many different types of vehicles include brakes and brake systems that are configured to slow or halt movement. In some cases, actuation of these brakes and brake systems can be performed automatically, such as under certain conditions (e.g., emergency braking operations), while in other cases actuation may be manual. For example, wheels of many standard automobiles include brake assemblies that are manually actuable, such as by a vehicle operator, to slow and ultimately halt rotation of the wheel and thus movement of the automobile.

SUMMARY

Certain vehicles, such as many automobiles, provide each wheel with a brake assembly. For example, a brake disc can be rigidly attached to each wheel, such that the brake disc rotates with the associated wheel. A brake caliper, which is disposed adjacent each brake disc, can be secured to a vehicle structural element that does not rotate with the wheel. The brake caliper can be actuated to cause a brake pad to contact at least one surface (such as a face) of the brake disc for the purpose of slowing rotation of the brake disc and thereby slowing rotation of the associated wheel. In other words, actuating the vehicle brake system (such as by depressing a brake pedal), moves the brake pad into contact with the rotating brake disc, which thereby slows rotation of the rotating wheel.

The rate of change of brake disc rotation depends on the magnitude of force applied thereto by the brake caliper. For example, softly pressing the brake pad against the brake disc slows the brake disc rotation at a low rate, while pressing the brake pad against the brake disc with a relatively strong force slows the brake disc rotation at a higher rate. The brake caliper can be regulated to vary the force applied to the brake disc, and thus control the rate of braking, such as in the case of a vehicle operator either applying a weak or strong pressing force to a brake pedal. Many different technologies can be used to regulate the pressure applied by the brake caliper, such as hydraulic based systems utilizing brake fluid.

Friction is created by the contact between the brake disc and brake pad, and both elements are thereby subject to substantial stresses. These stresses may become more significant based on an increase in wheel rotation speed, and/or the amount of pressing force applied by the brake caliper to the brake disc. The relevant brake assembly components, including the brake disc, brake pad and brake caliper, can be formed of materials that are to some extend resistant to the heat and mechanical stresses resulting by this frictional contact.

However, continued application of heat, and in some cases relatively high amounts of heat, may ultimately negatively affect both the structural integrity and operation of the affected components of the brake assemblies. For example, in the context of hydraulic based systems, exposing the brake fluid to an excessive amount of heat will cause it to boil, which may result in vapor lock. Vapor lock, as well as other similar conditions, may limit (and in some cases severely limit) brake assembly output, result in loss of control of the vehicle, etc.

Thus, it may be beneficial to provide cooling systems that may reduce the heat generated by the frictional contact between the brake pad and brake disc. For example, various components proximate the brake caliper, brake pad and brake disc can be disposed or configured to enhance access of air to the areas of frictional contact. In some cases, some of the relevant components can define holes, or spaces can be provided between components, to enable access of the air. Some of the heat generated by the frictional contact may be transferred to the air, which travels away from the brake assembly and is replaced by a fresh supply of air based on the natural movement of the vehicle, resulting in cooling of the components exposed to the heat generated by the frictional contact.

However, the amount of air that is provided access by virtue of the disposition and/or configuration of these components may not be sufficient to achieve the desired level of cooling, especially in applications that may generate relatively large frictional forces, such as high performance vehicles. Thus, supplemental cooling apparatus may be provided to achieve the desired level of cooling. For example, ducts may be provided that channel or otherwise direct air to the relevant components, which may increase the amount and pressure of air usable for cooling, resulting in enhanced cooling of the relevant components. The ducts may be provided at a variety of locations, and may be attached to a body member, suspension arm, etc.

However, these additional ducts may negatively impact other performance characteristics of the vehicle. For example, the ducts may be structurally substantial and thus add undesired weight to the vehicle. In addition, the ducts may negatively affect the aerodynamic characteristics and performance of the vehicle. For example, the fuel efficiency, handling, etc. of the vehicle may be negatively impacted by adding ducts that are designed to increase the amount and pressure of air provided to the brake system components and thereby enhance cooling.

It may therefore be beneficial to address at least one of the issues disclosed above, and/or address other issues. For example, it may be beneficial to increase the amount and/or pressure of air supplied to the brake assembly components to enhance the cooling effect provided thereby, while at the same time reducing, minimizing, or preventing some or all of the negative effects that may result by adding components, such as ducts, to the brake system. In some of the disclosed embodiments, ducts may be included to provide an enhanced air supply to the brake components while at the same time the ducts can be configured and disposed to reduce, minimize or prevent negative aerodynamic effects, such as drag. For example, the ducts of some of these embodiments dispose the ducts within other existing components to reduce the aerodynamic drag provided thereby, such as within a vehicle sub-frame member.

Some embodiments are therefore directed to a duct assembly for cooling a brake assembly of a vehicle that is capable of traveling in at least a forward direction. The brake assembly can include a front end that is disposed in front of a rear end in the forward direction of travel of the vehicle. The vehicle can include a sub-frame that is connected to the brake assembly by a suspension component.

The duct assembly can include a hollow inlet section that is disposed at the vehicle sub-frame and configured to capture air from beneath the vehicle sub-frame; and a hollow intermediate section that communicates with the inlet section so as to form a contiguous channel therewith. The intermediate section can be disposed entirely within the vehicle sub-frame. A hollow outlet section can communicate with the intermediate section so as to form a contiguous channel between the inlet, intermediate and outlet sections. The outlet section can be disposed and configured to direct the air captured by the inlet section to the front end of the brake assembly to thereby cool at least a portion of the brake assembly.

Some other embodiments are directed to a sub-frame and duct assembly for cooling a brake assembly of a vehicle that is capable of traveling in at least a forward direction. The brake assembly can include a front end that is disposed in front of a rear end in the forward direction of travel of the vehicle. The vehicle can also include a suspension component.

The sub-frame and duct assembly can include a sub-frame connected to the brake assembly by the suspension component, and a duct assembly. The duct assembly can include a hollow inlet section that is disposed at the vehicle sub-frame and configured to capture air from beneath the vehicle sub-frame; and a hollow intermediate section that communicates with the inlet section so as to form a contiguous channel therewith. The intermediate section can be disposed entirely within the vehicle sub-frame. A hollow outlet section can communicate with the intermediate section so as to form a contiguous channel between the inlet, intermediate and outlet sections. The outlet section can be disposed and configured to direct the air captured by the inlet section to the front end of the brake assembly to thereby cool at least a portion of the brake assembly.

Still other embodiments are directed to a method of manufacturing a duct assembly for cooling a brake assembly of a vehicle that is capable of traveling in at least a forward direction. The brake assembly can include a front end that is disposed in front of a rear end in the forward direction of travel of the vehicle. The vehicle can also include a sub-frame that is connected to the brake assembly by a suspension component.

The method can include: disposing a hollow inlet section at the vehicle sub-frame; configured the inlet section to capture air from beneath the vehicle sub-frame; providing a hollow intermediate section so as to communicate with the inlet section and thereby form a contiguous channel therewith; disposing the intermediate section entirely within the vehicle sub-frame; providing a hollow outlet section so as to communicate with the intermediate section and thereby form a contiguous channel between the inlet, intermediate and outlet sections; and configuring the outlet section to direct the air captured by the inlet section to the front end of the brake assembly to thereby cool at least a portion of the brake assembly.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 5 is a perspective view of an underside of an exemplary floor panel of the vehicle and an inlet of the brake cooling assembly.

FIG. 6 is a partial view of an underside of the sub-frame member and the brake cooling assembly.

FIG. 7 is a partial view of a top side of the sub-frame member and the brake cooling assembly.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overview

Figure 1:
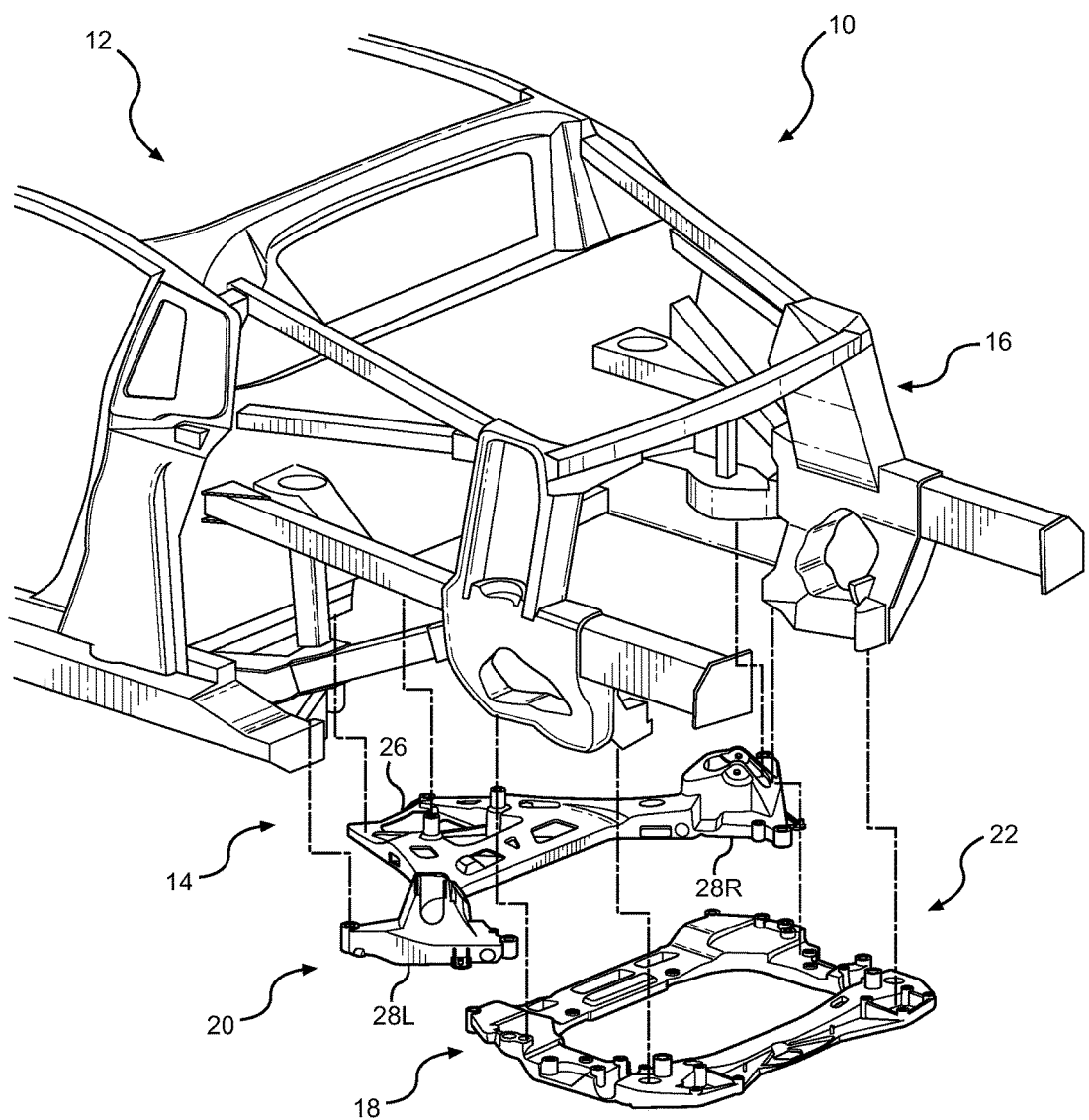
FIG. 1 is a partial, exploded, perspective view of a vehicle in accordance with the disclosed subject matter.

FIG. 1 illustrates an embodiment of a vehicle 10 made in accordance with the principles of the disclosed subject matter. The vehicle 10 can include a frame assembly 14 including a passenger compartment 12, and the frame assembly 14 can be configured to provide structural rigidity for the vehicle 10 and can provide mounting support for the various components and systems of the vehicle 10, such as but not limited to a power source, steering system, braking system, door(s), seat(s), instrument panel, energy supply system, climate control system, suspension components, exterior body panels, interior trim components, etc.

The frame assembly 14 can extend in a longitudinal direction from a front of the vehicle 10 to a rear of the vehicle 10. FIG. 1 shows only a portion of the frame assembly 14 that extends from the passenger compartment 12 to the rear of the vehicle 10. The remainder of the frame assembly 14 that continues through the passenger compartment and to the front of the vehicle 10 is omitted from FIG. 1 for clarity and simplicity of the view. The frame assembly 14 can be made from any appropriate known, related art or later developed material(s), such as but not limited to metal, metal alloy, plastic, carbon fiber, or any combination of these exemplary materials. Specifically, the frame assembly 14 can be made from aluminum or aluminum alloy. Various systems and components, such as but not limited to body panels, glass, doors, a suspension system and related components, a steering system and related components, a powertrain system and related components, and components and systems for the passenger compartment, can be directly or indirectly attached to the frame assembly 14.

The frame assembly 14 can include a space frame assembly 16 and a lower frame assembly 18. The lower frame assembly 18 can be directly or indirectly connected to the space frame assembly 16 in any appropriate manner, such as but not limited to adhesive bonding, one or more welds, mechanical fasteners, or any combination of these exemplary manners of connection. Alternatively, the space frame assembly 16 and lower frame assembly 18 can be formed as a single homogenous or unitary structure, such as by being integrally molded.

Referring to FIGS. 1-4, 6-8, 17 and 18, the lower frame assembly 18 can include a first sub-frame member 20 and a second sub-frame member 22. The first sub-frame member 20 can be directly or indirectly connected to the second sub-frame member 22 in any appropriate manner, such as but not limited to adhesive bonding, one or more welds, mechanical fasteners, or any combination of these exemplary manners of connection. Alternatively, the first sub-frame member 20 and second sub-frame member 22 can be formed as a single unitary structure, such as by being integrally molded.

II. First Sub-Frame Member

The first sub-frame member 20 can include a central frame portion 26 and a pair of lateral frame portions 28L, 28R. The central frame portion 26 and the lateral frame portions 28L, 28R can be integrally formed as a single homogenous unit, or as separate components that are directly or indirectly connected together in any appropriate manner, such as but not limited to mechanical fasteners, welding, adhesive bonding, inference fitting, or any combination of these exemplary connection techniques. The central frame portion 26 and the lateral frame portions 28L, 28R can be formed from any appropriate known, related art or later developed material, such as but not limited to metal, metal alloy, plastic, carbon fiber, or any combination of these exemplary materials.

As illustrated in FIG. 1, each of the central frame portion 26 and the lateral frame portions 28L, 28R can include a plurality of mounting points configured to facilitate connection of the first sub-frame member 20 to the space frame assembly 16 in any appropriate manner, such as but not limited to mechanical fasteners, welding, adhesive bonding, or any combination of these exemplary or other connection methods.

Referring to FIGS. 2-4 and 8, and as will be explained in greater detail below, a pair of rear suspension assemblies 32L (the right-side rear suspension assembly is not shown) can be mounted to the pair of lateral frame portions 28L, 28R of the first sub-frame member 20. The pair of rear suspension assemblies 32L connect a pair of brake assemblies 50L, 50R to the first sub-frame member 20 at the lateral frame portions 28L, 28R, respectively.

III. Rear Suspension and Brake Assemblies

Figure 3:
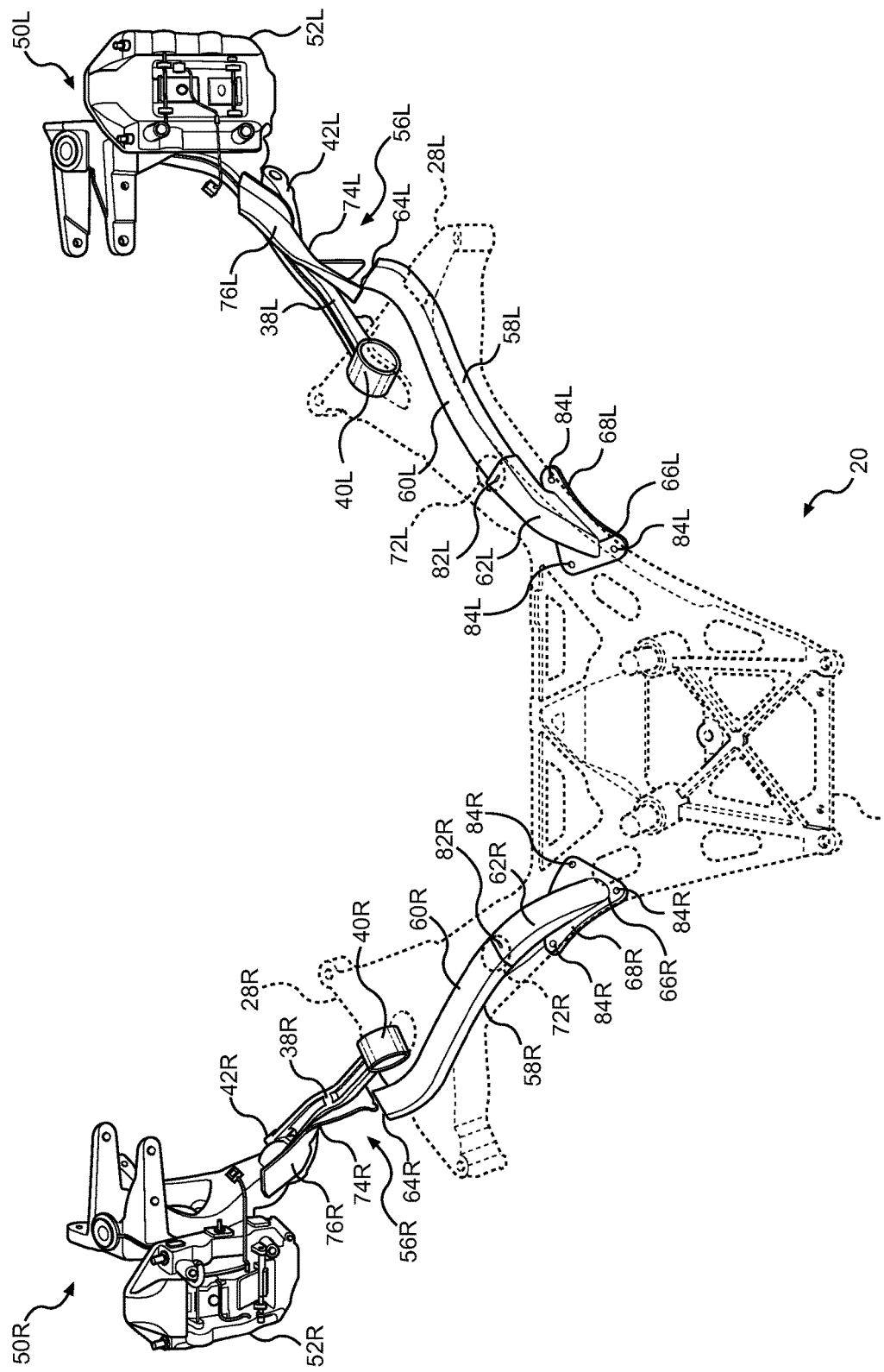
FIG. 3 is a perspective view of an exemplary sub-frame member of the vehicle with brake cooling assemblies and exemplary wheel hub assemblies.
Figure 4:
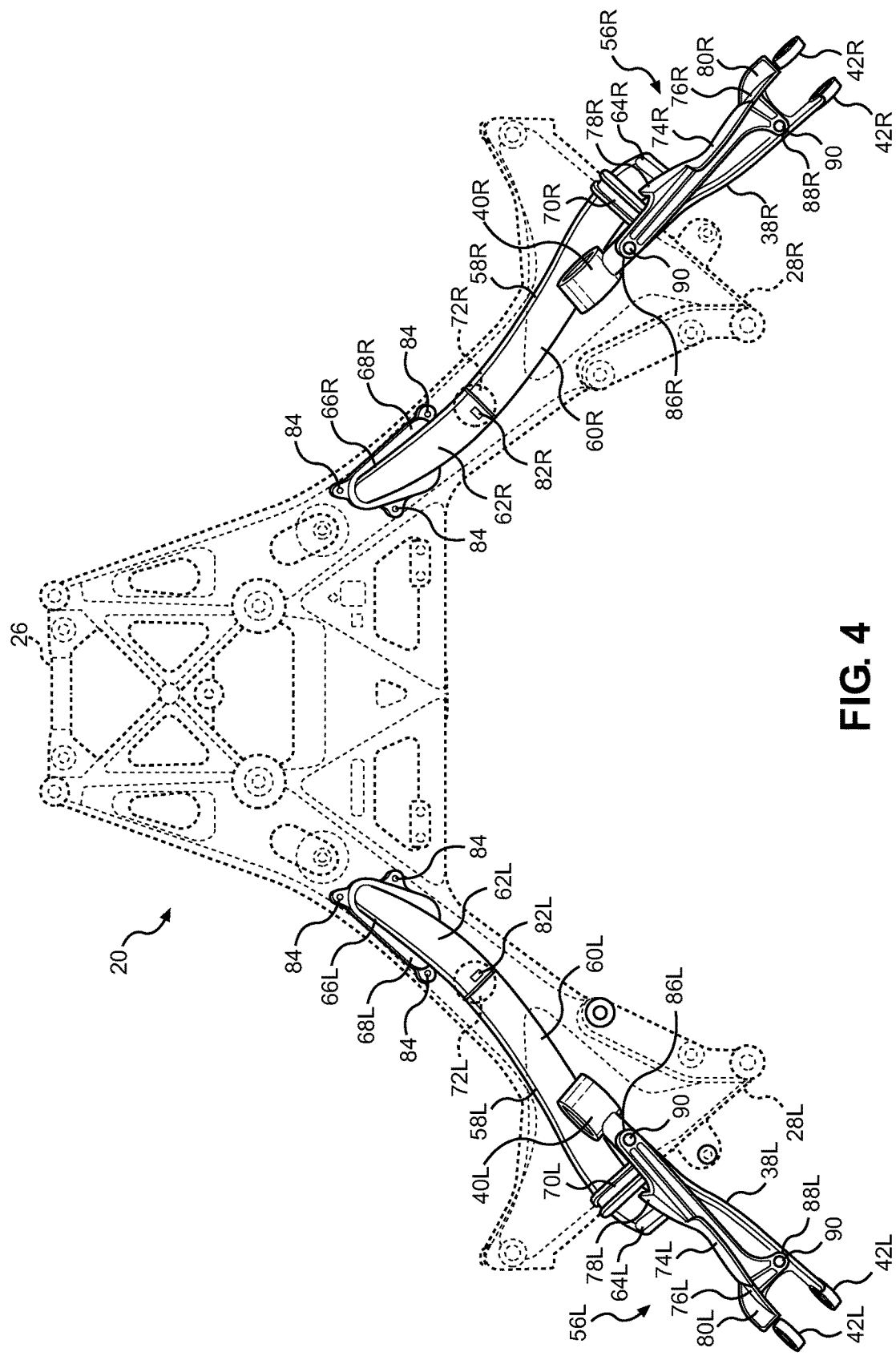
FIG. 4 is a top view of the sub-frame member and brake cooling assemblies.

Referring to FIG. 3, the vehicle 10 can include a left-side rear suspension assembly 32L, a right-side rear suspension assembly 32R, a left side brake assembly 50L and a right-side brake assembly 50R. The forgoing description is directed toward the left-side rear suspension assembly 32L and the left-side brake assembly 50L. However, it is to be understood that the right-side rear suspension assembly 32R and the right-side brake assembly 50R can have a similar structure and configuration to the left-side rear suspension assembly 32L and the left-side brake assembly 50L, respectively. Accordingly, like reference numbers are used for the right-side assemblies 32R, 50R that correspond to the respective feature(s) of the left-side assemblies 32L, 50L, with an "R" replacing the "L".

Figure 2:
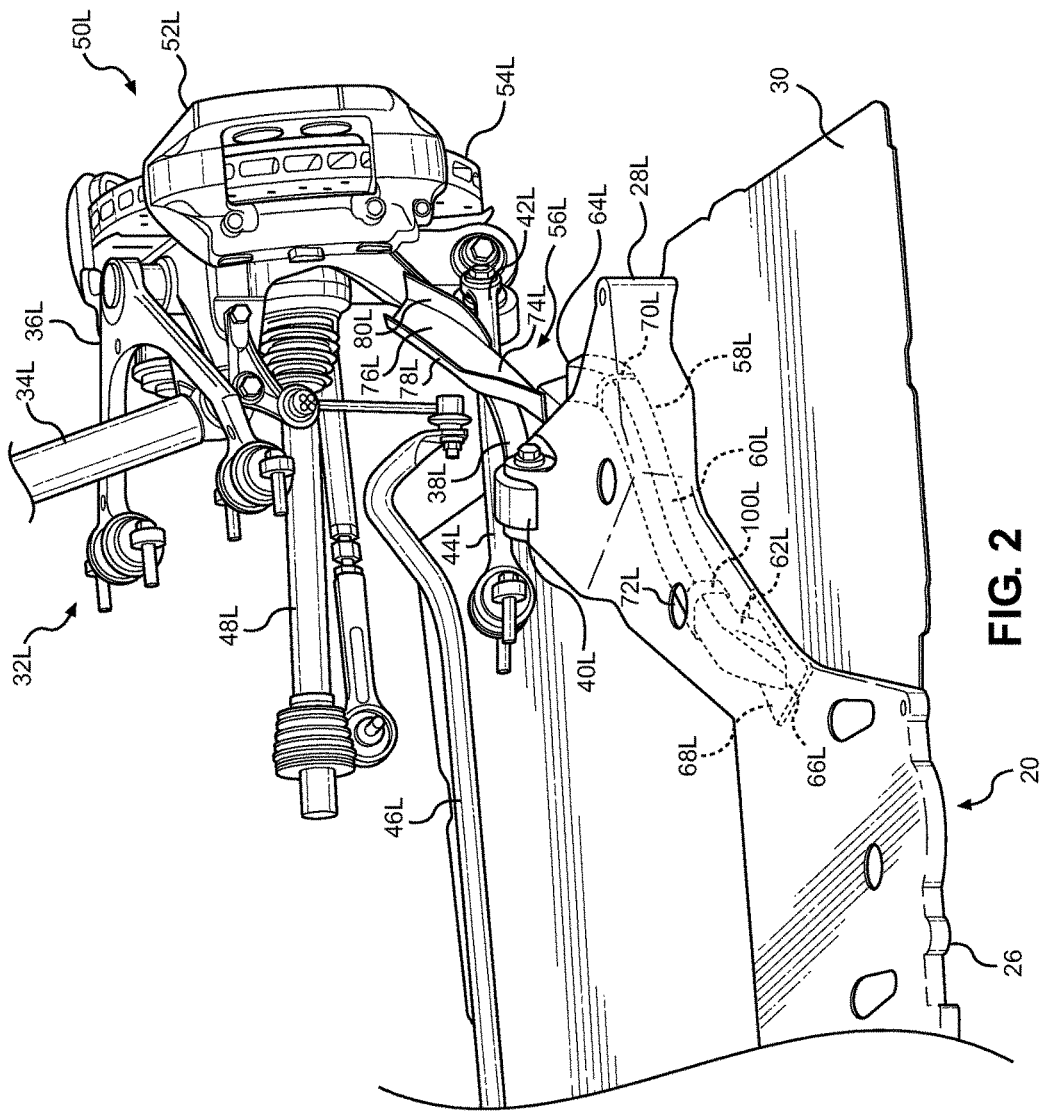
FIG. 2 is a partial perspective view of an exemplary rear suspension assembly and a brake cooling assembly of the vehicle in accordance with the disclosed subject matter.
Figure 8:
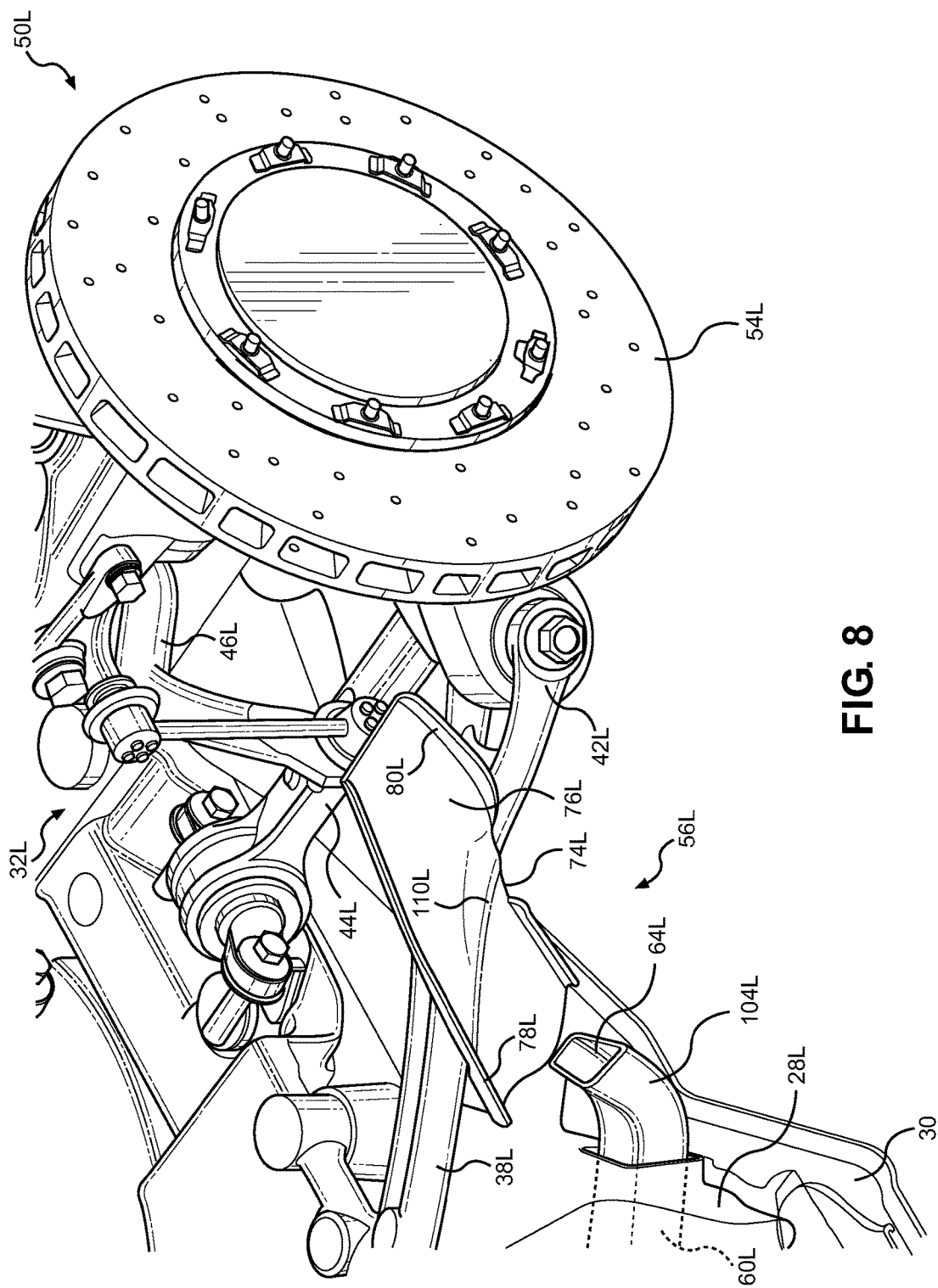
FIG. 8 is a partial perspective view of the rear suspension assembly and a deflector of the brake cooling assembly.

FIGS. 2 and 8 show partial perspective views of the rear suspension assembly 32L and the brake assembly 50L of the vehicle in accordance with the disclosed subject matter. As will be explained below, the brake assembly 50L is connected to the first sub-frame member 20 by a trailing arm 38L of the rear suspension assembly 32L.

The rear suspension assembly 32L can include a drive shaft 48L, a damper 34L, an upper wishbone 36L, the trailing arm 38L, a lateral link 44L, and an anti-roll bar 46L, as well as additional connecting component(s) illustrated but not further described herein. Alternatively, the rear suspension assembly 32L may have fewer components than those listed above, such as lacking the anti-roll bar 46L, for example. However, exemplary embodiments are intended to include or otherwise cover any appropriate configuration of the rear suspension assemblies 32L 32R, such as but not limited to a strut suspension assembly, a double wishbone (also referred to as a double A-arm suspension), a twist beam suspension assembly, etc. The trailing arm 38L can also be referred to as a lower control arm.

The trailing arm 38L is connected to the brake assembly 50L at a brake assembly connection end 42L, and is connected to the lateral frame portion 28L of the first sub-frame member 20 at a frame connection end 40L. The trailing arm 38L can be connected to the brake assembly 50L via a first fork joint, where the brake assembly connection end 42L is configured to be a fork end of the first fork joint. Similarly, the trailing arm 38L can be connected to the lateral frame portion 28L of the first sub-frame member 20 via a second fork joint, where the frame connection end 40L is configured to be an eye end of the second fork joint. Alternatively, the brake assembly connection end 42L may be an eye end of the first fork joint and the frame connection end 40L may be a fork end of the second fork joint. Furthermore, the trailing arm 38L may be connected to the brake assembly 50 and the first sub-frame member 20 by any other suitable joint type.

The brake assembly connection end 42L and the frame connection end 40L are joined together by an intermediate portion of the trailing arm 38L. As will be explained below, a deflector 74L of a brake cooling assembly 56L may be attached to the intermediate portion of the trailing arm 38L. The brake cooling assembly 56L captures and directs air towards the brake assembly 50L.

As shown in FIGS. 2, 3, and 8, the brake assembly 50L includes a brake caliper 52L and a brake disc 54L, as well as brake pads (not shown) attached to the brake caliper 52L to be compressed against the brake disc 54L. The present embodiment of the brake assembly 50L is configured to be a disc braking system, however other braking systems such as drum brakes may also be used. The brake caliper 52L may be configured as a single caliper, dual calipers, or any other number of calipers appropriate for the brake assembly 50L. The brake disc 54L of the brake assembly 50L may be drilled, slotted, or waved, or may be configured to include any combination thereof as well as additional cooling characteristics.

As described above, the brake cooling assembly 56L redirects air to the brake assembly 50L, and specifically towards the brake caliper 52L. The exemplary embodiment of the brake cooling assembly 56L is configured to capture air flowing beneath a floor panel 30 of the vehicle 10, as will be described below, and redirect the air up through a hollow portion of the first sub-frame member 20 towards the brake assembly 50L.

IV. Brake Cooling Assembly

The forgoing description is directed toward the left-side brake cooling assembly 56L. However, it is to be understood that the right-side brake cooling assembly 56R can have a similar structure and configuration to the left-brake cooling assembly 56L. Accordingly, like reference numbers are used for the right-side assembly 56R that correspond to the respective feature(s) of the left-side brake cooling assembly 56L, with an "R" replacing the "L".

FIGS. 2-4 and 6-9 show perspective views of the brake cooling assembly 56L, as well as various other components of the vehicle 10 such as the first sub-frame member 20, rear suspension assembly 32L and brake assembly 50L, in accordance with the disclosed subject matter.

The brake cooling assembly 56L includes a duct assembly 58L, which extends through the hollow portion of the first sub-frame member 20 from the central frame portion 26 to the lateral frame portion 28L. The hollow portion of the first sub-frame member 20 includes an elongated channel having a first opening on a bottom surface of the first sub-frame member 20 adjacent the central frame portion 26, and a second opening on a rear surface of the first sub-frame member 20 at the lateral frame portion 28L. The first opening on the bottom surface of the first sub-frame member 20 is aligned with a floor opening of a similar size and shape in the floor panel 30 of the vehicle 10 so that air may pass through the floor opening to reach the first opening of the first sub-frame member 20 unobstructed. The second opening on the rear surface of the first sub-frame member 20 is proximate the brake assembly 50L, and specifically positioned so that air passing through the second opening is directed towards the brake assembly 50L. Moreover, the channel connects the first opening and the second opening, providing a continuous passage from the first opening to the second opening via the channel. In some embodiments, air may pass directly through the aforementioned channel in the hollow portion of the first sub-frame member 20 without use of a duct assembly 58L. Embodiments in which the duct assembly 58L is omitted may include inlet and/or outlet components connected to the hollow portion of the first sub-frame member 20 to redirect air, such as into the hollow portion or onto the brake assembly 50L. Such inlet and outlet components may be formed of plastic through molding, extruding, thermoforming, etc. Alternatively, the components may be formed of any other suitable material, such as a metal or metal alloy, or other material composites, such as carbon fiber, and likewise can be formed by an appropriate process suited to the material.

As will be described below, the duct assembly 58L included in the brake cooling assembly 56L further includes a duct inlet 62L and a duct outlet 60L. Both the duct inlet 62L and the duct outlet 60L are hollow and tubular in shape, and configured to be insertable into the channel of the hollow portion of the first sub-frame member 20.

In the exemplary embodiment, the duct inlet 62L has an inlet opening 66L formed at a front end of the duct inlet 62L that is positioned within the first opening on the bottom surface of the first sub-frame member 20. The inlet opening 66L is therefore also aligned with the floor opening of the floor panel 30 of the vehicle 10 so that air passing through the floor opening reaches the inlet opening 66L of the duct inlet 62L.

As shown in more detail in FIGS. 9-12, the duct inlet 62L also has an inlet flange 68L surrounding the inlet opening 66L by which the duct inlet 62L is attached to the first sub-frame member 20. The inlet flange 68L extends parallel to the bottom surface of the first sub-frame member 20, and has multiple inlet flange apertures 92L through which inlet flange rivets 84 are inserted to secure the inlet flange 68L to the first sub-frame member 20. The inlet flange rivets 84 are inserted through a bottom side of the inlet flange apertures 92L on a bottom surface of the inlet flange 68L and then through the bottom surface of the first sub-frame member 20 to attach the duct inlet 62L. In the exemplary embodiment, the inlet flange 68L has three inlet flange apertures 92L, however the inlet flange 68L may have one, two, three, four, etc. inlet flange apertures 92L to appropriately secure the inlet flange 68L. Furthermore, the inlet flange 68L can be directly or indirectly connected to the first sub-frame member 20 in any appropriate manner, such as but not limited to adhesive bonding, one or more welds, other mechanical fasteners, or any combination of these exemplary manners of connection.

As shown in more detail in FIG. 5, a top surface of the floor panel 30 of the vehicle 10 is positioned adjacent the bottom surface of the inlet flange 68L so as to sandwich the inlet flange 68L between the top surface of the floor panel 30 and the bottom surface of the first sub-frame member 20. In other words, the floor opening of the floor panel 30, the inlet opening 66L of the duct inlet 62L, and the first opening of the first sub-frame member 20 are each aligned to formed consecutive openings through which air may pass.

FIGS. 5, 6, 10, and 12 also provide more detail of the inlet opening 66L and surrounding inlet flange 68L, specifically showing an inlet wall 94L formed along a rear portion of the bottom surface of the inlet flange 68L. The inlet wall 94L extends a partial length of the rear portion of the inlet flange 68L, and may be configured to include two sections joined at an angle. Alternatively, the inlet wall 94L may be a single linear section, or may include more than two sections joined at multiple angles. The inlet wall 94L may additionally be configured so that at least a section of the inlet wall 94L is aligned with a rear edge of the inlet opening 66L.

Figure 9:
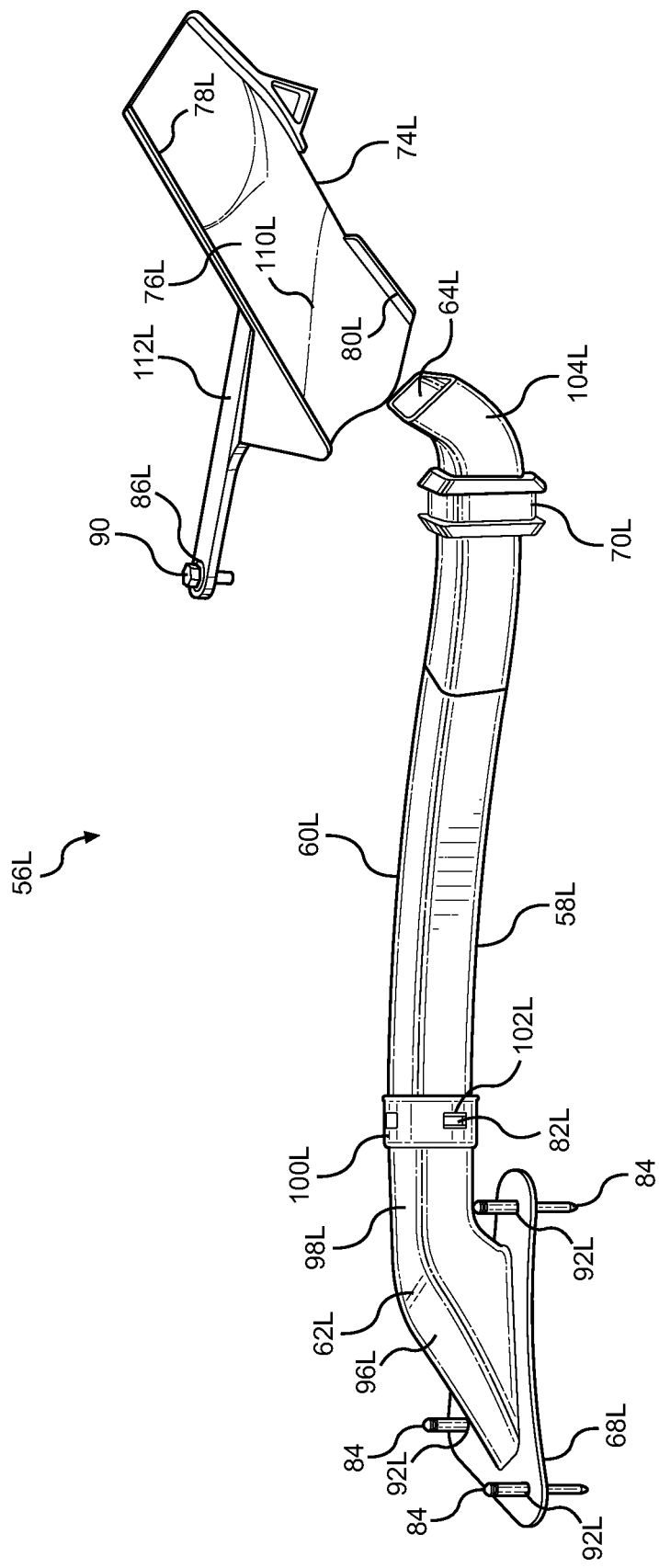
FIG. 9 is a perspective view of the brake cooling assembly.
Figure 10:
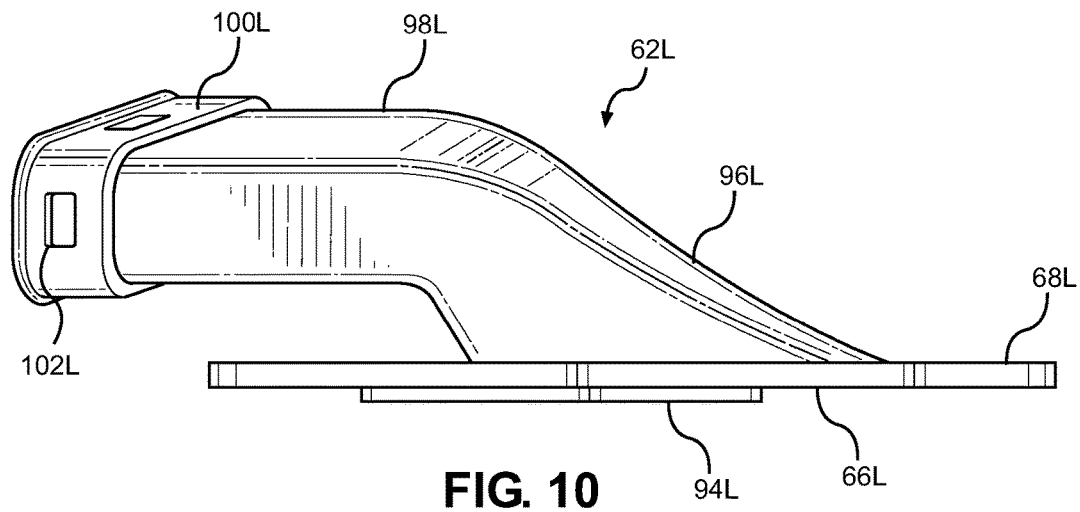
FIG. 10 is a side view of a duct inlet of the brake cooling assembly.
Figure 11:
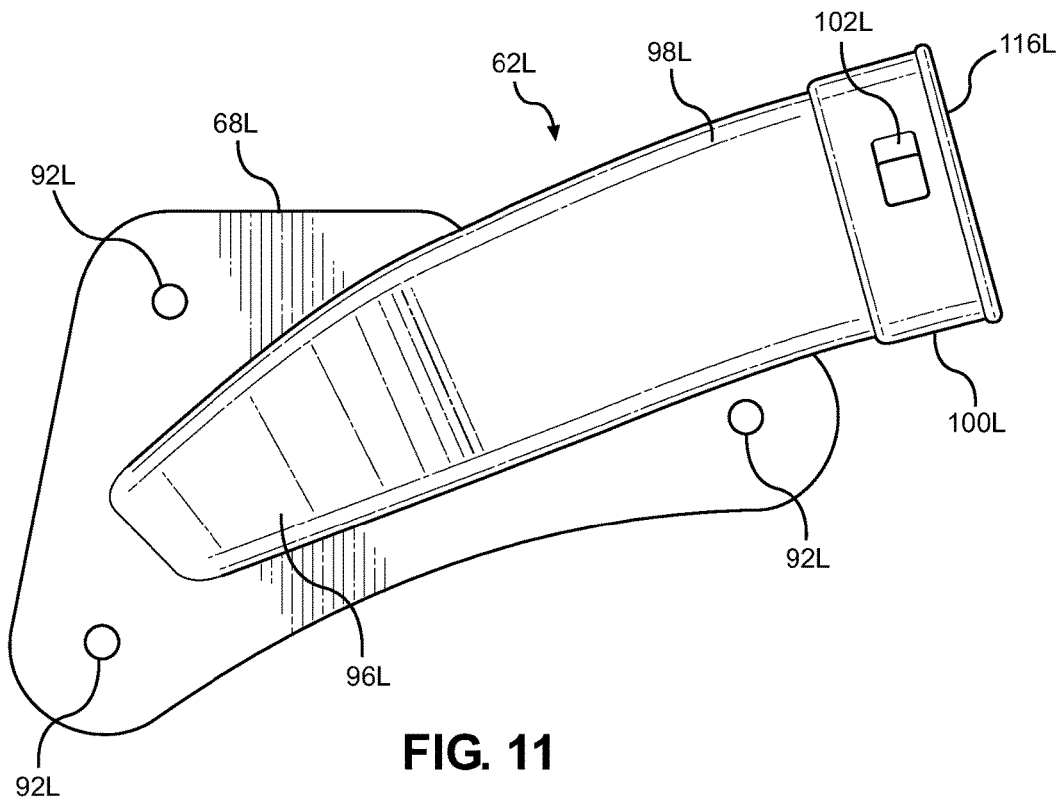
FIG. 11 is a top view of the duct inlet of the brake cooling assembly.
Figure 12:
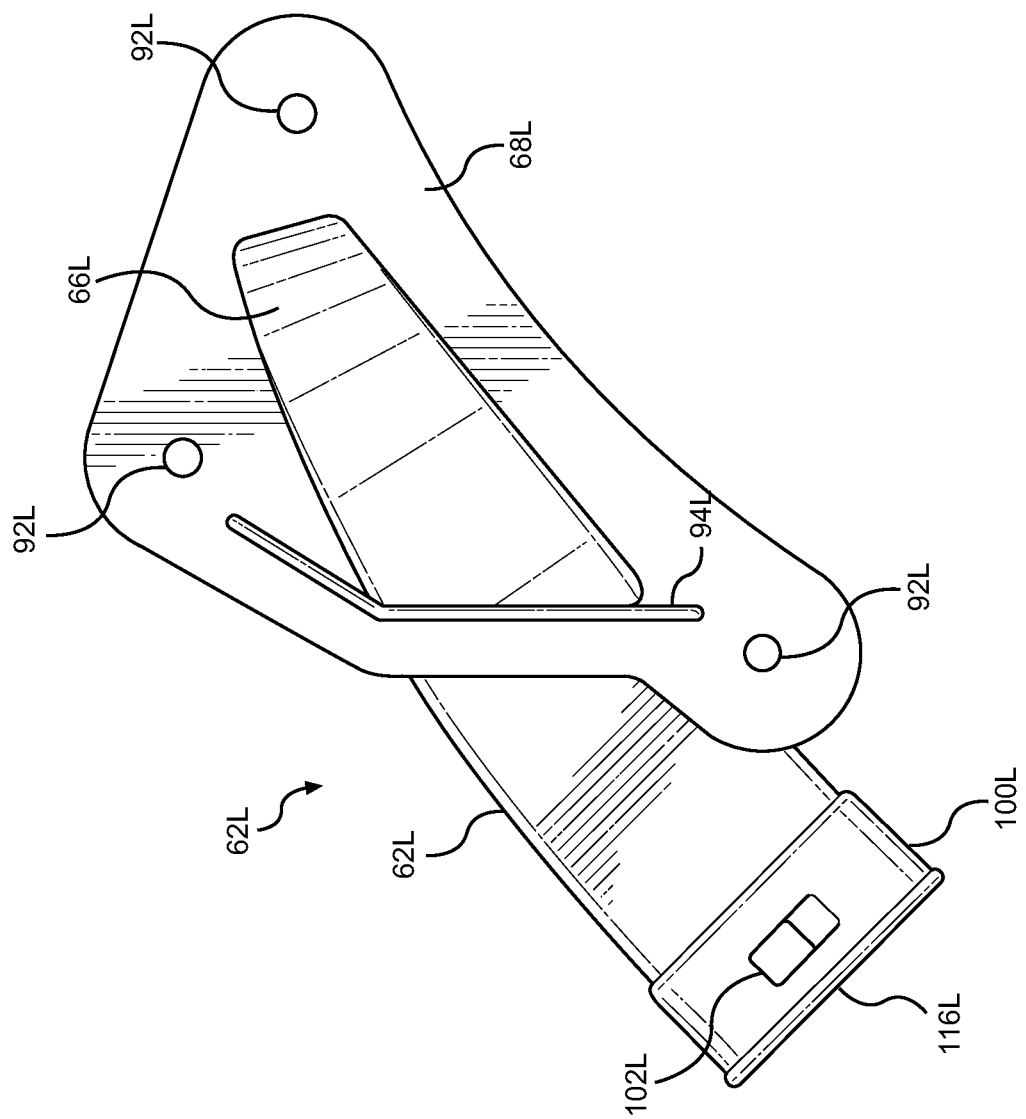
FIG. 12 is a bottom view of the duct inlet of the brake cooling assembly.

In the exemplary embodiment, and as shown in more detail in FIGS. 9 and 10, the duct inlet 62L includes an inclined inlet portion 96L and a horizontal inlet portion 98L, which are formed continuously and together make up the tubular portion of the duct inlet 62L. The inclined inlet portion 96L extends upward and rearward from the inlet opening 66L so as to form a sloped portion, but may however be configured to solely extend upward. The inclined inlet portion 96L transitions to the horizontal inlet portion 98L, which extends approximately parallel to the floor panel 30 of the vehicle 10.

The inclined inlet portion 96L serves to direct air up into the first sub-frame member 20, while the horizontal inlet portion 98L serves to direct air within the first sub-frame member 20 rearwards towards the duct outlet 60L, and ultimately towards the brake assembly 50L. However, other configurations of the duct inlet 62L may be used to direct air up through the first sub-frame member 20.

A rear portion of the duct inlet 62L, specifically at a rear portion of the horizontal inlet portion 98L, includes a duct connection flange 100L. The duct connection flange 100L connects the duct inlet 62L to the duct outlet 60L to form the duct assembly 58L, which extends through the hollow portion of the first sub-frame member 20 from the inlet opening 66L to an outlet opening 64L in the duct outlet 60L, and is described below.

As shown in more detail in FIGS. 9-12, the duct connection flange 100L has an inlet connection opening 116L having an increased outer circumference in comparison to a portion of the horizontal inlet portion 98L adjacent the duct connection flange 100L. The duct connection flange 100L also includes multiple connection flange openings 102L, each of which extends from an outer surface of the duct connection flange 100L to an inner surface thereof. In the exemplary embodiment, the duct connection flange 100L has four sides and includes a connection flange opening 102L in each side for a total of four connection flange openings 102L, however any suitable number of sides and connection flange openings 102L may be appropriate. The connection flange openings 102L may further be rectangular in shape, however otherwise shaped openings may also be appropriate, such as circular openings. Each connection flange opening 102L is configured to be engaged by a duct connection protrusion 82L of the duct outlet 60L, which will be described below.

In the exemplary embodiment, the duct outlet 60L extends from the duct connection flange 100L of the duct inlet 62L through the hollow portion of the first sub-frame member 20 and out the second opening in the first sub-frame member 20.

Figure 13:
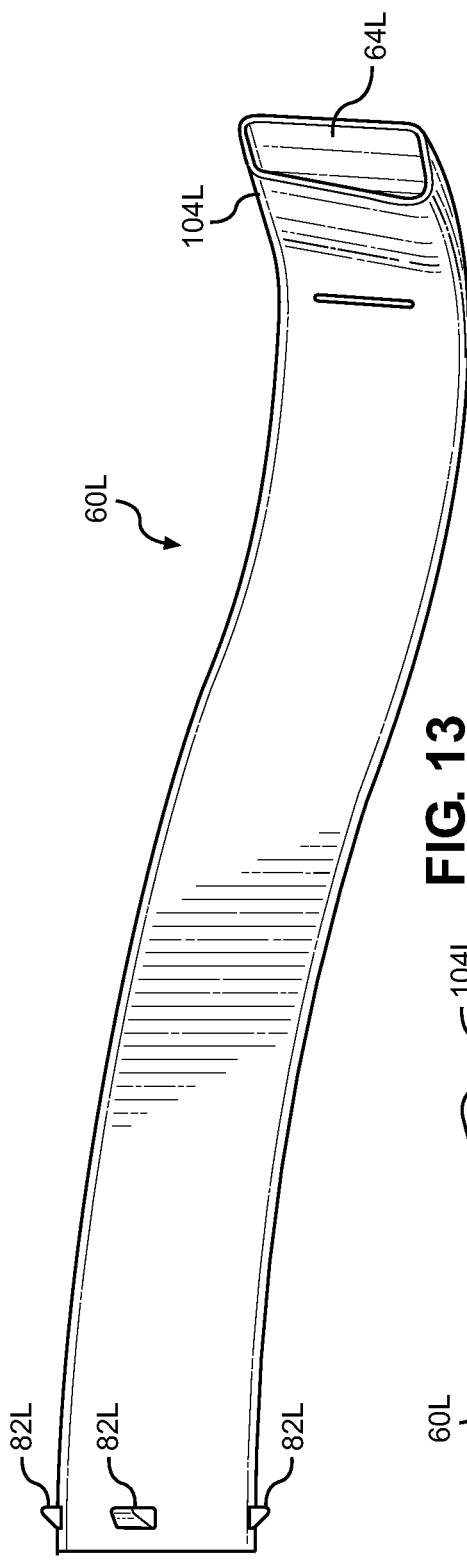
FIG. 13 is a top view of a duct outlet of the brake cooling assembly.
Figure 14:
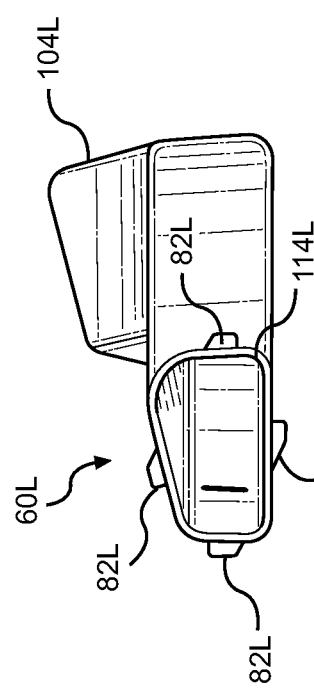
FIG. 14 is a front view of the duct outlet of the brake cooling assembly.
Figure 15:
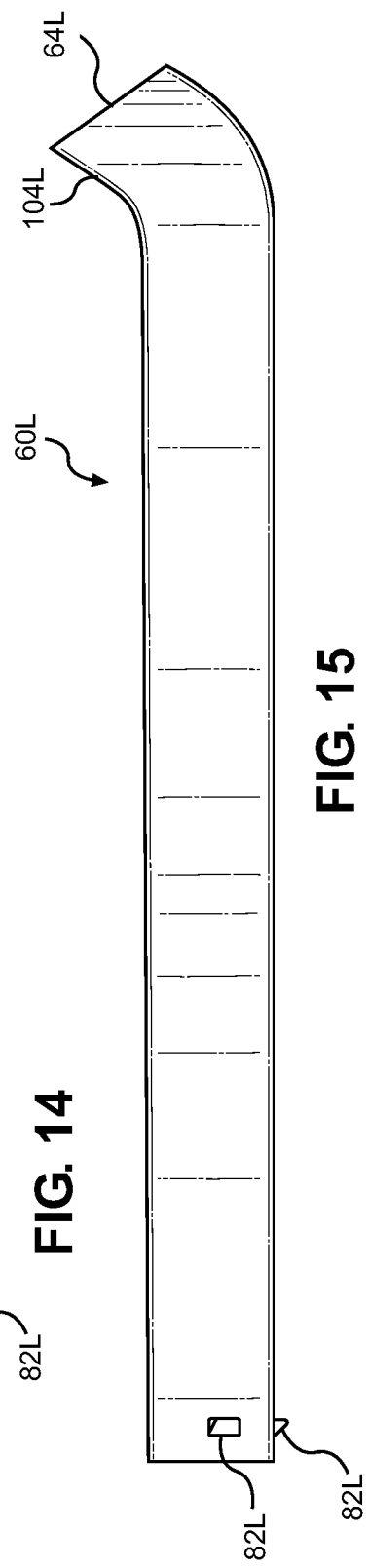
FIG. 15 is a side view of the duct outlet of the brake cooling assembly.

As shown in more detail in FIGS. 13-15, the duct outlet 60L is a hollow tubular portion that is slightly contoured to follow contours of the hollow portion of the first sub-frame member 20 within which it extends. An outlet connection opening 114L at a front end of the duct outlet 60L is configured to be insertable into the duct connection flange 100L of the duct inlet 62L, the front end of the duct outlet 60L having a lesser outer circumference. The duct connection protrusions 82L are positioned at the front end of the duct outlet 60L, and are wedge-shaped so as to be capable of engagement with the connection flange openings 102L. In the exemplary embodiment, the duct outlet 60 has four duct connection protrusions 82L to align with the four connection flange openings 102L of the duct inlet 62L, however any amount of duct connection protrusions 82L may be included that appropriately matches the number of connection flange openings 102L. Additionally, other locking mechanisms may be used to secure the connection between the duct outlet 60L and the duct inlet 62L at the duct connection flange 100L.

As shown in FIGS. 2-4 and 7, a first sub-frame opening 72L in a top surface of the first sub-frame member 20 is positioned above the duct connection flange 100L so as to provide an unobstructed view of the duct connection flange 100L. The first sub-frame opening 72L may be circular or otherwise appropriately shaped to provide an unobstructed view of the duct connection flange 100L. Additionally, FIGS. 6 and 7 show a second sub-frame opening 106L and a third sub-frame opening 108L in the top and bottom surfaces of the first sub-frame member 20, respectively. The second sub-frame opening 106L and the third sub-frame opening 108L provide additional views of the duct assembly 58L.

The first, second, and third sub-frame openings 72L, 106L, 108L can serve to provide views of the duct assembly 58L and the duct connection flange 100L to monitor the connection between the duct outlet 60L and the duct inlet 62L, and can be used to monitor engagement of the duct connection protrusions 82L with the connection flange openings 102L. However, other structures may be used to monitor the connection.

A rear end of the duct outlet 60L includes the outlet opening 64L and is positioned toward the brake assembly 50L. The duct outlet 60L extends horizontally, approximately parallel to the floor panel 30 of the vehicle 10. However, an outlet duct tip 104L at the rear end of the duct outlet 60L extends beyond the second opening of the first sub-frame member 20 and is inclined so as to slope upward and toward the brake assembly 50L. Furthermore, in the exemplary embodiment and as specifically detailed in FIG. 8, the outlet duct tip 104L slopes to further direct airflow through the duct assembly towards the deflector 74L, which in turn directs airflow towards the brake assembly 50L. The configuration of the deflector 74L will be described in detail below. The brake caliper 52L has been omitted from FIG. 8 for clarity and simplicity of the view.

The duct assembly 58L, including both the duct outlet 60L and the duct inlet 62L may be formed of plastic through molding, extruding, thermoforming, etc. However, the duct assembly 58L may alternatively be formed of any other suitable material such as a metal or metal alloy, or other material composites such as carbon fiber, and likewise can be formed by an appropriate process suited to the material. As described previously, some embodiments may be configured to omit the duct assembly 58L so that air passes directly through the channel in the hollow portion of the first sub-frame member 20.

The duct outlet 60L of the present embodiment is secured within the second opening of the first sub-frame member 20 by an outlet grommet 70L. As shown in more detail in FIGS. 17 and 18, the outlet grommet 70L is configured to surround the duct outlet 60L at a rear portion adjacent and forward of the outlet duct tip 104L. The outlet grommet 70L has flanges to secure the outlet grommet 70L to the second opening of the first sub-frame member 20. As shown in detail in FIG. 18, the outlet grommet 70L can also have cutouts in an interior surface corresponding to duct connection protrusions 82L of the duct outlet 60L configured to permit passage of the duct connection protrusions 82L upon insertion of the duct outlet 60L through the outlet grommet 70L and into the first sub-frame member 20. Additionally, the outlet grommet 70L can be made of rubber, however the outlet grommet 70L may be any other elastic or non-elastic material.

The outlet grommet 70L serves to secure the duct outlet 60L within the second opening of the first sub-frame member 20 and prevent rattling between components. However, other structures may be used for component retention and rattle prevention.

The duct outlet 60L and the duct inlet 62L are each configured to be insertable into the hollow portion of the first sub-frame member 20 through the second opening and the first opening of the first sub-frame member 20, respectively. Specifically, the outlet connection opening 114L can be inserted through a rearward-facing side of the outlet grommet 70L in the second opening of the first sub-frame member 20, while the inlet connection opening 116L can be inserted through a downward-facing side of the first opening of the first sub-frame member 20. However, embodiments are intended to include any other way of positioning the duct outlet 60L and the duct inlet 62L within the first sub-frame member 20.

In the exemplary embodiment, the brake cooling assembly 56L also includes a deflector 74L attached to the rear suspension assembly 32L of the vehicle 10. As described below, the deflector 74L may be attached to the trailing arm 38L of the rear suspension assembly 32L. Other embodiments may be configured to omit the deflector 74L so that air exiting the duct assembly 58L passes over the brake assembly 50L without being deflected. In such instances, the outlet duct tip 104L may extend farther rearwards towards the brake assembly 50L so as to shorten a distance the air exiting the duct assembly 58L travels before reaching the brake assembly 50L. Alternatively, embodiments in which the duct assembly 58L is omitted may also be configured to exclude the deflector 74L, instead channeling air exiting the hollow portion of the first sub-frame member 20 directly towards the brake assembly 50L without being deflected.

Figure 16:
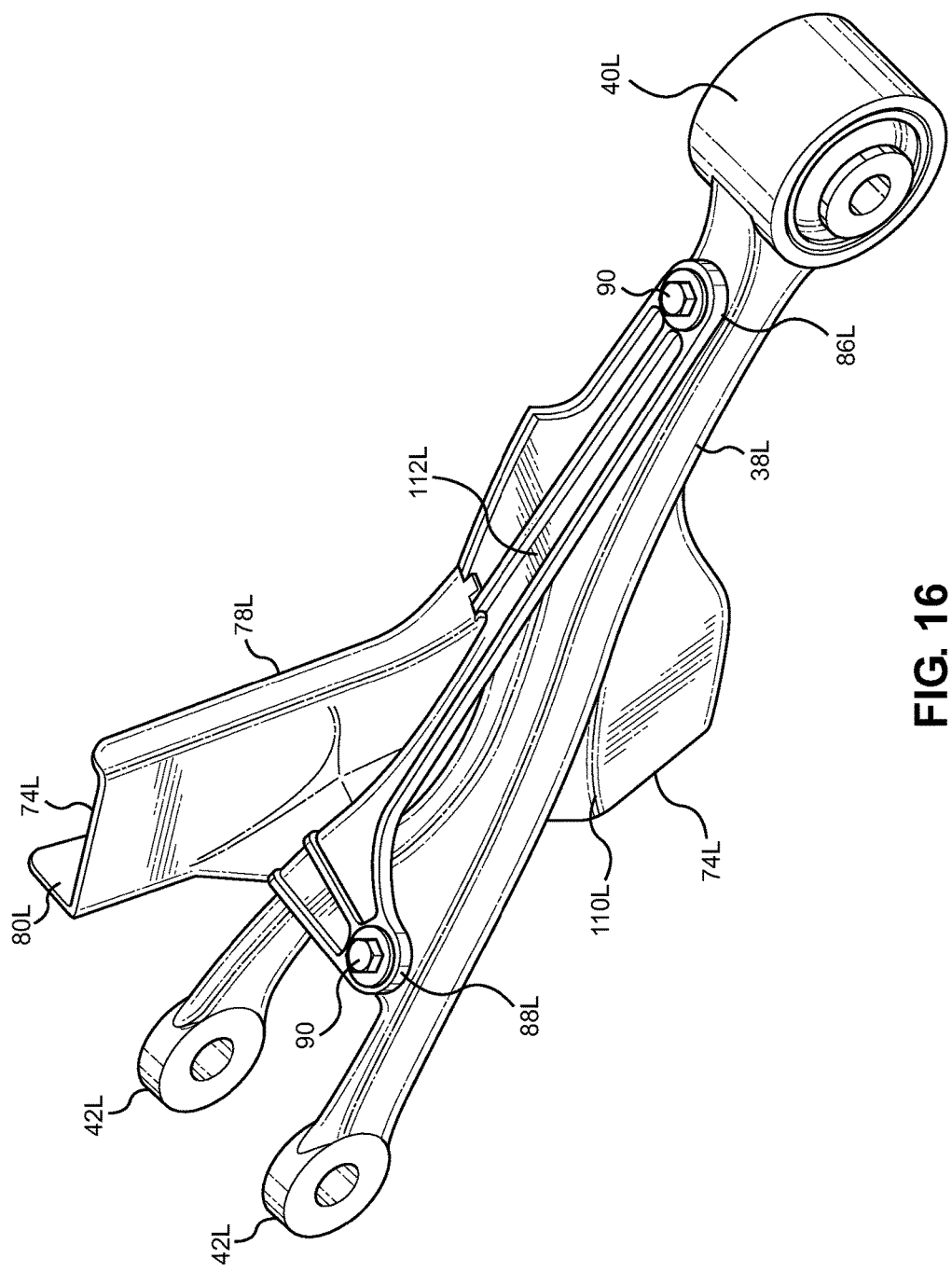
FIG. 16 is a perspective view of the deflector of the brake cooling assembly connected to an exemplary trailing arm of the rear suspension assembly.
Figure 17:
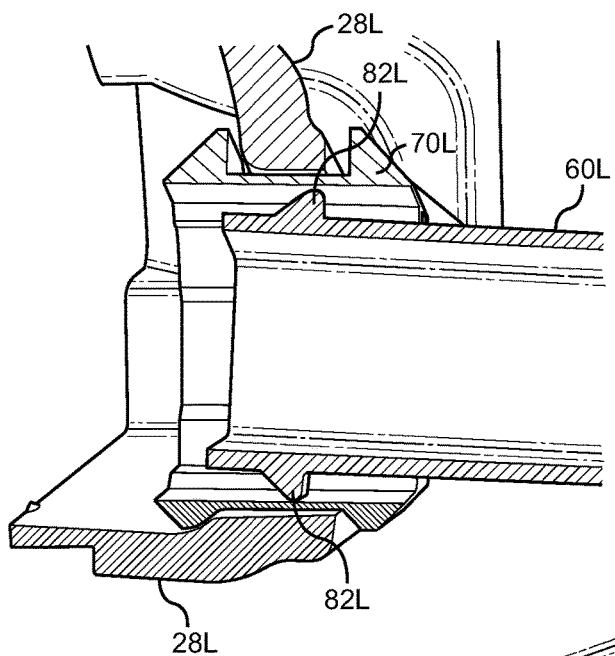
FIG. 17 is a cross-section view of an insertion end of the duct outlet of the brake cooling assembly during insertion into the sub-frame member of the vehicle.
Figure 18:
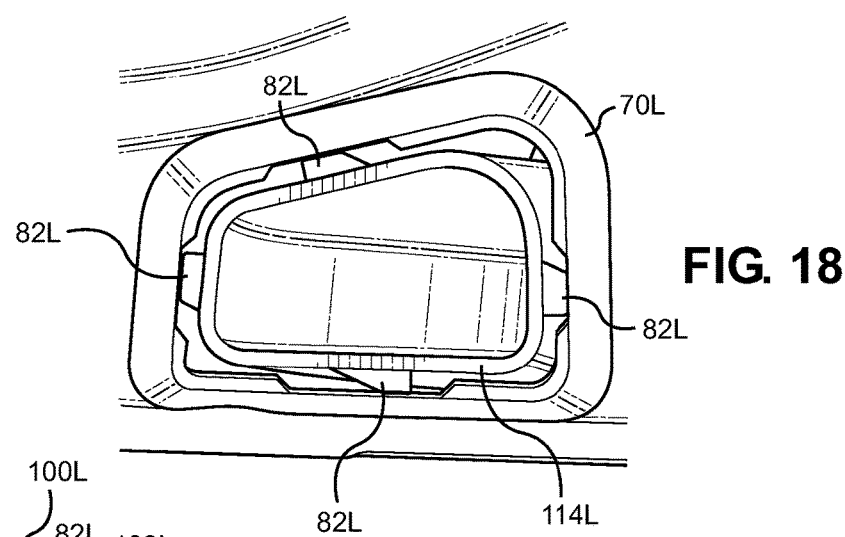
FIG. 18 is a front view of an insertion end of the duct outlet of the brake cooling assembly during insertion into the sub-frame member of the vehicle.
Figure 19:
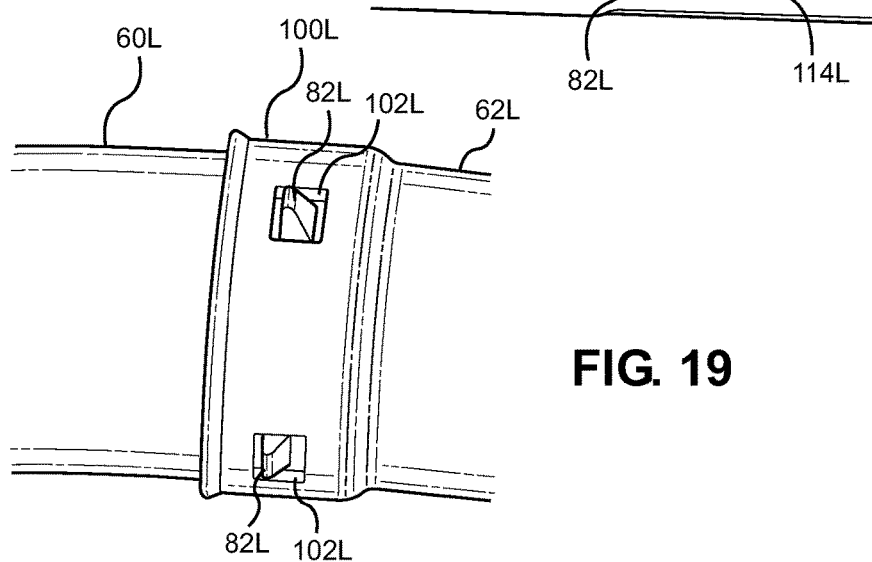
FIG. 19 is a partial side view of the duct inlet and the duct outlet at a connection portion.

As shown in more detail in FIG. 16, the deflector 74L is attached to the trailing arm 38L via a first deflector flange 86L at a front portion of a deflector brace 112L, and a second deflector flange 88L at a rear portion of the deflector brace 112L. The deflector brace 112L of the deflector 74L connects the first deflector flange 86L and the second deflector flange 88L, and provides a surface on which a deflector surface 76L is positioned. The first deflector flange 86L and the second deflector flange 88L align with corresponding apertures in the trailing arm 38L, and deflector bolts 90 are therein inserted through top sides of the first deflector flange 86L and the second deflector flange 88L and into the apertures of the trailing arm 38L to secure the deflector 74L to the trailing arm 38L. The deflector brace 112L of the deflector 74L may have an alternate configuration and number of flanges, and may be secured to the trailing arm 38L by any appropriate manner, such as but not limited to adhesive bonding, one or more welds, other mechanical fasteners, or any combination of these exemplary manners of connection. Furthermore, the deflector 74L may be secured to other components of the rear suspension assembly 32L such as the lateral link 44L, upper wishbone 36L, etc.

The deflector surface 76L of the exemplary deflector 74L is oriented vertically so as to be approximately perpendicular to the floor panel 30 of the vehicle 10, as shown in more detail in FIGS. 8 and 9. However, the deflector surface 76L may have any orientation appropriate to direct airflow towards the brake assembly 50L, and specifically towards the brake caliper 52L. In the exemplary embodiment, the deflector surface 76L is approximately planar, and may have one or more sections contoured to adjacent portions of the trailing arm 38L to which the deflector 74L is attached. For example, in the present embodiment, the deflector surface 76L is contoured around the adjacent portion of the trailing arm 38L so as to form a deflector step 110L in the deflector surface 76L. The deflector step 110L serves as a transition between uneven sections of the deflector surface 76L. To contour around the trailing arm 38L, the deflector step 110L may be steeply or gradually sloped, or may alternatively be formed as an edge. The deflector surface 76L may alternatively be spaced from the trailing arm 38L and therefore be planar and without contours.

The deflector surface 76L has a front portion proximate the outlet duct tip 104L of the duct assembly 58L, and a rear portion proximate the brake assembly 50L. The deflector surface 76L may be configured to narrow in width from the front portion to the rear portion, thereby creating a funnel in conjunction with deflector edges 78L and 80L that will be described below. Alternatively, the width of the deflector surface 76L may remain constant or increase from the front portion to the rear portion.

The deflector 74L may also include an upper deflector edge 78L and a lower deflector edge 80L to extend along an upper and lower edges of the deflector surface 76L, respectively. The upper deflector edge 78L and the lower deflector edge 80L can extend a length of the deflector surface 76L, or may alternative extend a partial length of the deflector surface 76L. Additionally, the upper deflector edge 78L and the lower deflector edge 80L can be segmented into multiple sections so to provide gaps in various places along the upper and lower edges of the deflector surface 76L. Furthermore, the deflector 74L may include both the upper deflector edge 78L and the lower deflector edge 80L, either the upper deflector edge 78L or the lower deflector edge 80L, or be configured without either. In the exemplary embodiment, the upper deflector edge 78L and the lower deflector edge 80L can also have varying widths appropriate for relative positioning along the upper and lower edges of the deflector surface 76L.

The upper deflector edge 78L and the lower deflector edge 80L serve to direct airflow along the deflector surface 76L and towards the brake assembly 50L, keeping air from exiting the deflector surface 76L in directions other than towards the brake assembly 50L. As noted above, other structures may be used to direct airflow towards the brake assembly 50L.

The deflector 74L serves to redirect airflow exiting the outlet opening 64L of the duct assembly 58L towards the brake assembly 50L, and specifically towards the brake caliper 52L. However, as noted above, various other configurations and structures may be used to direct air towards the brake assembly 50L.

V. Method of Operation

In operation, the brake cooling assemblies 56L,R capture and direct airflow passing underneath the vehicle 10 towards the brake assemblies 50L,R to cool components such as the brake calipers 52L,R.

Once moving, the vehicle 10 displaces surrounding air, resulting in a portion of the surrounding air passing underneath the floor panel 30 of the vehicle 10. Some of the air passing underneath the floor panel 30 flows up into the floor openings in the floor panel 30, and into the inlet openings 66L,R of the duct inlets 62L,R. Inlet walls 94L,R at the rear portions of the inlet openings 66L,R block passing air, urging the air up into the inlet openings 66L,R.

The air entering the inlet openings 66L,R then travels through intermediate portions of the duct assemblies 58L,R, routing the air through the first sub-frame member 20 of the vehicle 10. The air then exits the duct assemblies 58L,R through the outlet openings 64L,R in the outlet duct tips 104L,R, which are upwardly curved to further direct the air towards the deflectors 74L,R mounted on the trailing arms 38L,R of the rear suspension assemblies 32L,R.

Air directed onto the deflectors 74L,R travels along the deflector surface 76L,R from the front end to the rear end, and is funneled by the upper and lower deflector edges 78L,R, 80L,R towards the brake assemblies 50L,R. Air that exits the deflectors 74L,R flows towards the brake calipers 52L,R, some of which reaches the brake calipers 52L,R and thereby ventilates and cools the brake assemblies 50L,R.

The above-described method of operation for cooling brake assemblies 50L,R increases the airflow to heat-sensitive components of the vehicle 10 while maintaining desirable aerodynamic characteristics including drag. Additionally, routing airflow through existing structures of the vehicle 10 such as the first sub-frame member 20 and the trailing arm 38 reduces engineering costs and time expended on modified structures already present in the vehicle 10.

VI. Alternative Embodiments

While certain embodiments of the invention are described above, and FIGS. 1-19 disclose the best mode for practicing the various inventive aspects, it should be understood that the invention can be embodied and configured in many different ways without departing from the spirit and scope of the invention.

In the disclosed embodiment, various structures are applied to a brake cooling system of a vehicle having a floor panel, specifically a uniform and planar floor panel, covering an underside of the vehicle. However, the disclosed structures may alternatively be applied to or modified to cooperate with any type of vehicle having any structural configuration on an underside of the vehicle, including vehicles having no floor panel at all.

The exemplary embodiments are also directed to a brake cooling assembly intended to include both a duct assembly extending through a portion of a sub-frame assembly, and a deflector mounted to a suspension component of the vehicle. However, alternate embodiments may include a duct assembly without a deflector or a deflector without a duct assembly. Furthermore, in embodiments including a deflector, the deflector may be alternatively mounted to other components and structures of the vehicle, and may even be mounted to the sub-frame assembly. Exemplary embodiments with a deflector mounted to the suspension assembly are configured so that the deflector is mounted to a trailing arm. However, any other suspension component forward of a brake assembly of the vehicle may be a suitable mounting position for the deflector.

In the disclosed embodiment, the brake cooling assembly is intended to be used to direct airflow to rear brake assemblies of a vehicle. However, alternate embodiments can be configured to direct airflow to front brake assemblies of the vehicle.

Additionally, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

Embodiments are also intended to include or otherwise cover methods of using and methods of manufacturing any or all of the elements disclosed above. The methods of manufacturing include or otherwise cover processors and computer programs implemented by processors used to design various elements of the vehicle door adjuster disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A duct assembly for cooling a brake assembly of a vehicle that is capable of traveling in at least a forward direction, the brake assembly including a front end that is disposed in front of a rear end in the forward direction of travel of the vehicle, the vehicle also including a sub-frame that is connected to the brake assembly by a suspension component, the sub-frame including an aperture in a bottom surface of a lower wall, the duct assembly comprising:
   a hollow inlet section that is disposed within the vehicle sub-frame, the hollow inlet section defining an aperture that is contiguous with the aperture defined in the bottom surface of the sub-frame such that the hollow inlet section is configured to capture air from beneath the vehicle sub-frame;
   a hollow intermediate section that communicates with the inlet section so as to form a contiguous channel therewith, the intermediate section being disposed entirely within the vehicle sub-frame; and
   a hollow outlet section that communicates with the intermediate section so as to form a contiguous channel between the inlet, intermediate and outlet sections, the outlet section being disposed and configured to direct the air captured by the inlet section to the front end of the brake assembly to thereby cool at least a portion of the brake assembly.

2. The duct assembly according to claim 1, further including an inlet flange that is connected to the bottom surface of the lower wall of the vehicle sub-frame, the inlet flange defining the aperture of the hollow inlet section.

3. The duct assembly according to claim 2, wherein the vehicle sub-frame includes an upper wall spaced from the lower wall, such that the intermediate section extends between the upper and lower walls.

4. The duct assembly according to claim 3, wherein the outlet and intermediate sections are unitary, while the intermediate and inlet sections constitute separate sections that are connected together by a duct connection flange.

5. The duct assembly according to claim 4, wherein the upper wall of the vehicle sub-frame defines an inspection aperture that is disposed adjacent the duct connection flange to enable viewing of the duct connection flange from an exterior of the vehicle sub-frame.

6. The duct assembly according to claim 2, wherein the inlet flange defines a planar lower exterior surface and a wall that extends substantially perpendicular to the lower exterior surface adjacent a rear side of the aperture of the inlet flange to direct air into the aperture when the vehicle is moving in the forward direction of travel.

7. The duct assembly according to claim 1, further including an upper deflector connected to the vehicle suspension component, the upper deflector being disposed and configured to deflect air exiting the outlet section toward the front end of the brake assembly to thereby cool at least a portion of the brake assembly.

8. The duct assembly according to claim 7, wherein the upper deflector includes a base, an upper side extending along the entire length of one side of the base, and a lower side extending along only part of the length of an opposing side of the base, the upper and lower sides extending substantially perpendicular to the base.

9. The duct assembly according to claim 8, wherein a distance separating the upper and lower sides at a location closest to the outlet section is greater than a distance separating the upper and lower sides at a location furthest from the outlet section.

10. The duct assembly according to claim 1, wherein at least a portion of the outlet section projects beyond a rear end of the vehicle sub-frame.

11. A sub-frame and duct assembly for cooling a brake assembly of a vehicle that is capable of traveling in at least a forward direction, the brake assembly including a front end that is disposed in front of a rear end in the forward direction of travel of the vehicle, the vehicle including a suspension component, the sub-frame and duct assembly comprising:
 a sub-frame connected to the brake assembly by the suspension component; and
 a duct assembly that includes:
  a hollow inlet section that is disposed at the vehicle sub-frame and configured to capture air from beneath the vehicle sub-frame;
  a hollow intermediate section that communicates with the inlet section so as to form a contiguous channel therewith, the intermediate section being disposed entirely within the vehicle sub-frame;
  a hollow outlet section that communicates with the intermediate section so as to form a contiguous channel between the inlet, intermediate and outlet sections, the outlet section being disposed and configured to direct the air captured by the inlet section to the front end of the brake assembly to thereby cool at least a portion of the brake assembly, and
  an upper deflector mounted on the suspension component and spaced away from the each of the inlet, intermediate and outlet sections, and the upper deflector being disposed and configured to deflect air exiting the outlet section toward the front end of the brake assembly to thereby cool at least a portion of the brake assembly.

12. The duct assembly according to claim 11, further including an inlet flange that is connected to a bottom surface of a lower wall of the vehicle sub-frame, the inlet flange defining an aperture that is contiguous with a corresponding aperture defined in the bottom surface of the vehicle sub-frame at the inlet flange as well as the channel defined between the inlet, intermediate and outlet sections.

13. The duct assembly according to claim 12, wherein the vehicle sub-frame includes an upper wall spaced from the lower wall, such that the intermediate section extends between the upper and lower walls, and at least a portion of the outlet section projects beyond a rear end of the vehicle sub-frame.

14. The duct assembly according to claim 13, wherein the outlet and intermediate sections are unitary, while the intermediate and inlet sections constitute separate sections that are connected together by a duct connection flange.

15. The duct assembly according to claim 14, wherein the upper wall of the vehicle sub-frame defines an inspection aperture that is disposed adjacent the duct connection flange to enable viewing of the duct connection flange from an exterior of the vehicle sub-frame.

16. The duct assembly according to claim 12, wherein the inlet flange defines a planar lower exterior surface and a wall that extends substantially perpendicular to the lower exterior surface adjacent a rear side of the aperture of the inlet flange to direct air into the aperture when the vehicle is moving in the forward direction of travel.

17. The duct assembly according to claim 11, wherein the upper deflector includes a base, an upper side extending along the entire length of one side of the base, and a lower side extending along only part of the length of an opposing side of the base, the upper and lower sides extending substantially perpendicular to the base.

18. The duct assembly according to claim 17, wherein a distance separating the upper and lower sides at a location closest to the outlet section is greater than a distance separating the upper and lower sides at a location furthest from the outlet section.

19. A duct assembly for cooling a brake assembly of a vehicle that is capable of traveling in at least a forward direction, the brake assembly including a front end that is disposed in front of a rear end in the forward direction of travel of the vehicle, the vehicle also including a sub-frame that is connected to the brake assembly by a suspension component, the duct assembly comprising:
 a hollow inlet section that is disposed at the vehicle sub-frame and configured to capture air from beneath the vehicle sub-frame;
 a hollow intermediate section that communicates with the inlet section so as to form a contiguous channel therewith, the intermediate section being disposed entirely within the vehicle sub-frame; and
 a hollow outlet section that communicates with the intermediate section so as to form a contiguous channel between the inlet, intermediate and outlet sections, the outlet section being disposed and configured to direct the air captured by the inlet section to the front end of the brake assembly to thereby cool at least a portion of the brake assembly, and at least a portion of the outlet section projects beyond a rear end of the vehicle sub-frame.

* * * * *